US011279361B2

United States Patent
Nishitani et al.

(10) Patent No.: US 11,279,361 B2
(45) Date of Patent: Mar. 22, 2022

(54) EFFICIENCY IMPROVEMENT FOR MACHINE LEARNING OF VEHICLE CONTROL USING TRAFFIC STATE ESTIMATION

(71) Applicant: TOYOTA MOTOR ENGINEERING & MANUFACTURING NORTH AMERICA, INC., Erlanger, KY (US)

(72) Inventors: Ippei Nishitani, Mountain View, CA (US); Hao Yang, Mountain View, CA (US); Rui Guo, Mountain View, CA (US); Shalini Keshavamurthy, Mountain View, CA (US); Kentaro Oguchi, Mountain View, CA (US)

(73) Assignee: TOYOTA MOTOR ENGINEERING & MANUFACTURING NORTH AMERICA, INC., Erlanger, KY (US)

( * ) Notice: Subject to any disclaimer, the term of this patent is extended or adjusted under 35 U.S.C. 154(b) by 294 days.

(21) Appl. No.: 16/503,204

(22) Filed: Jul. 3, 2019

(65) Prior Publication Data

US 2021/0001857 A1     Jan. 7, 2021

(51) Int. Cl.
*H04W 4/40* (2018.01)
*B60W 30/18* (2012.01)
*G05D 1/00* (2006.01)

(52) U.S. Cl.
CPC ..... *B60W 30/18163* (2013.01); *G05D 1/0088* (2013.01); *H04W 4/40* (2018.02); *B60W 2554/80* (2020.02); *G05D 2201/0213* (2013.01)

(58) Field of Classification Search
CPC ....... B60W 30/18163; B60W 2554/80; B60W 60/001; B60W 2050/0088; G05D 1/0088;
(Continued)

(56) References Cited

U.S. PATENT DOCUMENTS 8,751,154 B2    6/2014   Zhang et al.
9,308,917 B2    4/2016   Oh et al.
(Continued)

OTHER PUBLICATIONS

Chen, et al., "DeepDriving: Learning Affordance for Direct Perception in Autonomous Driving", openaccess.thevcvf.com, May 7, 2019, pp. 2722-2730.
(Continued)

*Primary Examiner* — Peter D Nolan
*Assistant Examiner* — Ashley L Redhead, Jr.
(74) *Attorney, Agent, or Firm* — Seyfarth Shaw LLP

(57) ABSTRACT

A method of improving efficiency of a vehicle behavior controller using a traffic state estimation network is described. The method includes feeding an input of a feature extraction network of the vehicle behavior controller with a sequence of images. The sequence of images include a highway section and corresponding traffic data. The method also includes disentangling an estimated behavior of a controlled ego vehicle. by the traffic state estimation network. The traffic state estimate network disentangles the estimated of the controlled ego vehicle from extracted traffic state features of the input provided by the feature extraction network. The method further includes selecting an action to adjust an autonomous behavior of the controlled ego vehicle according to the estimated behavior of the controlled ego vehicle.

18 Claims, 11 Drawing Sheets

(58) Field of Classification Search
CPC ... G05D 2201/0213; H04W 4/40; G08G 1/00;
G06N 7/005; G06N 3/0454; G06N 3/08;
G06N 3/006
See application file for complete search history.

(56) References Cited

U.S. PATENT DOCUMENTS

| | | |
|---|---|---|
| 9,324,232 B2 | 4/2016 | Feldman et al. |
| 2014/0372016 A1* | 12/2014 | Buchholz ............ G06K 9/00785 |
| | | 701/117 |
| 2019/0364492 A1* | 11/2019 | Azizi ................ H04W 52/0264 |
| 2019/0371087 A1* | 12/2019 | Shin ..................... G08G 1/0141 |
| 2020/0239000 A1* | 7/2020 | Chen ................... B60W 40/076 |

OTHER PUBLICATIONS

Dabiri, et al., "Transpod-Domain Applications of Widely Used Data Sources in the Smart Transportation: A Survey", arxiv.org, May 7, 2019.

* cited by examiner

EFFICIENCY IMPROVEMENT FOR MACHINE LEARNING OF VEHICLE CONTROL USING TRAFFIC STATE ESTIMATION

BACKGROUND

Field

Certain aspects of the present disclosure generally relate to autonomous vehicle technology and, more particularly, to a system and method for improving machine learning of vehicle control using traffic state estimation.

Background

Autonomous agents (e.g., vehicles, robots, etc.) rely on machine vision for sensing a surrounding environment by analyzing areas of interest in images of the surrounding environment. Although scientists have spent decades studying the human visual system, a solution for realizing equivalent machine vision remains elusive. Realizing equivalent machine vision is a goal for enabling truly autonomous agents. Machine vision, however, is distinct from the field of digital image processing because machine vision involves recovering a three-dimensional (3D) structure of the world from images and using the 3D structure for fully understanding a scene. That is, machine vision strives to provide a high-level understanding of a surrounding environment, as performed by the human visual system.

Autonomous agents, such as driverless cars and robots, are quickly evolving and becoming a reality in the next decade. Unfortunately, because autonomous agents have to interact with humans, many critical concerns arise. For example, how to design vehicle control of an autonomous vehicle using machine learning. Vehicle control by machine learning in complicated traffic environments involving complex interactions between vehicles (e.g. a situation where a controlled (ego) vehicle merges onto a traffic lane) is desired. In particular, machine learning techniques for vehicle control using a network to select an appropriate vehicle control action of an ego vehicle are desired. For example, a selected speed/acceleration/steering angle of the controlled (ego) vehicle may be applied as a vehicle control action. These conventional machine learning techniques do not determine a current traffic state of the surrounding environment based on image data as well as traffic data, including a road image, much less apply this information to the input for selecting vehicle control actions. Because the ego vehicle is controlled in a space limited by a road shape, both the traffic data as well as available image may be used to select vehicle control actions.

SUMMARY

A method of improving efficiency of a vehicle behavior controller using a traffic state estimation network is described. The method includes feeding an input of a feature extraction network of the vehicle behavior controller with a sequence of images. The sequence of images include a highway section and corresponding traffic data. The method also includes disentangling an estimated behavior of a controlled ego vehicle. by the traffic state estimation network. The traffic state estimate network disentangles the estimated of the controlled ego vehicle from extracted traffic state features of the input provided by the feature extraction network. The method further includes selecting an action to adjust an autonomous behavior of the controlled ego vehicle according to the estimated behavior of the controlled ego vehicle.

A system to improve efficiency of behavior controller of a controlled ego vehicle is described. The system includes a vehicle behavior controller. The vehicle behavior controller includes a feature extraction network configured to receive a sequence of images of a highway section and corresponding traffic data. The system also includes a traffic state estimation network configured to disentangle an estimated behavior of the controlled ego vehicle from extracted traffic features of an input provided by the feature extraction network. The system further includes a controller configured to select an action to adjust an autonomous behavior of the controlled ego vehicle according to the estimated behavior of the controlled ego vehicle.

A non-transitory computer-readable medium having program code recorded thereon for improving efficiency of a vehicle behavior controller using a traffic state estimation network is described. The program code is executed by a processor and includes program code to feed an input of a feature extraction network of the vehicle behavior controller with a sequence of images of a highway section and corresponding traffic data. The non-transitory computer-readable medium also includes program code to disentangle, by the traffic state estimation network, an estimated behavior of a controlled ego vehicle from extracted traffic state features of the input provided by the feature extraction network. The non-transitory computer-readable medium also includes program code to select an action to adjust an autonomous behavior of the controlled ego vehicle according to the estimated behavior of the controlled ego vehicle.

This has outlined, rather broadly, the features and technical advantages of the present disclosure in order that the detailed description that follows may be better understood. Additional features and advantages of the present disclosure will be described below. It should be appreciated by those skilled in the art that the present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
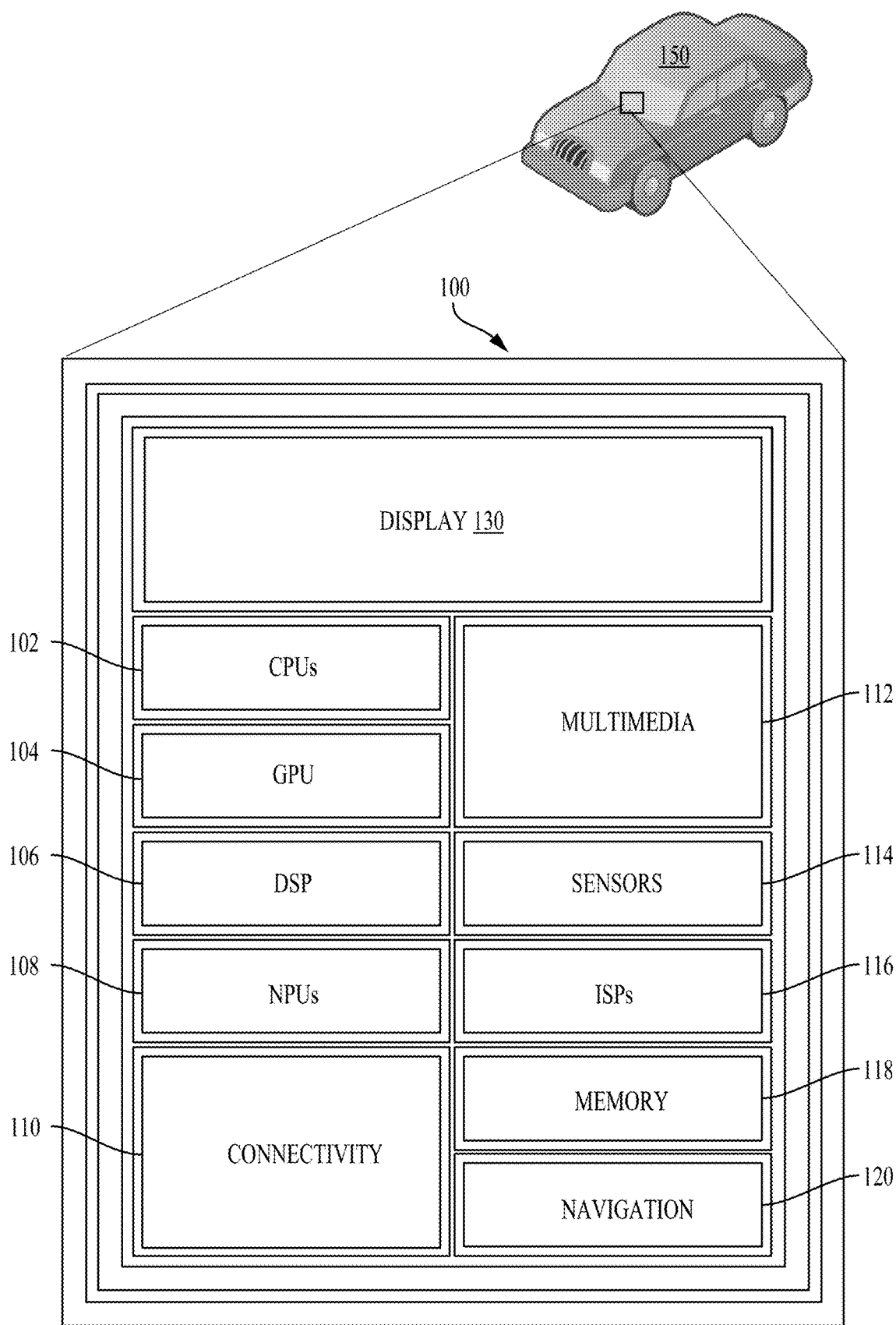
FIG. 1 illustrates an example implementation of designing a neural network using a system-on-a-chip (SOC) for a vehicle behavior control system, in accordance with aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure disclosed may be embodied by one or more elements of a claim.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses, or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure, rather than limiting the scope of the present disclosure being defined by the appended claims and equivalents thereof.

Traffic congestion on highways affects millions of people and presents an urgent problem in need of a solution. Automation of vehicle control on highways is rapidly advancing and expected to meet the goals of reducing traffic accidents and improving traffic efficiency. In particular, vehicles at highway merging sections (e.g., such as on-ramps and lane-drop bottlenecks) perform lane changes, which may generate traffic oscillations and extra congestion. Both main-lane and on-ramp traffic are potentially congested due to irregular lane change behavior and unexpected braking maneuvers of surrounding vehicles. Directing timing and speed of controlled vehicles when merging onto main-lane traffic in a manner that is not detrimentally to main-line and on-ramp highway traffic may effectively reducing traffic congestion. According to one aspect of the present disclosure, a vehicle merging controller is described to effectively merge a controlled vehicle onto a highway main-lane while reducing the traffic impact on the highway main-lanes and on-ramps.

Improved vehicle control by machine learning in complicated traffic environments are desired, because conventional rule-based algorithms may not adapt to these complicated traffic environments. For example, these traffic environments may involve complex interactions between vehicles, including situations where a controlled (ego) vehicle merges onto a traffic lane. Machine learning techniques for vehicle control may use a network to select an appropriate vehicle control action from input data relative to the ego vehicle. For example, a selected speed/acceleration/steering angle of the controlled (ego) vehicle may be applied as a vehicle control action.

Unfortunately, these conventional machine learning techniques do not determine a current traffic state of the surrounding environment of an ego vehicle. This current traffic state may be determined based on image data as well as traffic data, including a road image. Furthermore, these conventional machine learning techniques do not apply this current traffic state information when selecting vehicle control actions. Because the ego vehicle is controlled in a space limited by a road shape, both the traffic data as well as available image may be used to determine the current traffic state information to improve selection of vehicle control actions.

Aspects of the present disclosure add a current traffic state estimation task to improve a vehicle control machine learning network structure. Adding the current traffic state estimation task to a network of a vehicle control machine learning model involves the network explicitly estimating the current traffic state. In this aspect of the present disclosure, a network of the vehicle control machine learning model is trained to understand a surrounding environment. For example, the surrounding environment is represented by current traffic states, including controlled vehicles, surrounding vehicles, and road information relative to an ego vehicle. In this configuration, a network of the vehicle control machine learning model is trained to identify the current traffic state. In aspects of the present disclosure, the surrounding environment of a controlled, ego vehicle is represented by dynamic traffic states, including controlled vehicles, surrounding vehicles, and road information relative to the controlled, ego vehicle.

In one aspect of the present disclosure, a proposed system uses images of a target zone, including road data and vehicles, and/or numerical values of traffic information. These images may be fed as input to a vehicle control task trained to determine a current traffic state from the images. This image or traffic data can be acquired by using a road side unit (RSU), in-vehicle sensors, road map information, and/or vehicle-to-vehicle (V2V) communication (e.g., in connected vehicle environments). As a result, a process for selecting appropriate vehicle control actions is simplified. In addition, the number of trials performed during training to achieve a desired performance is also reduced.

According to aspects of the present disclosure, the current traffic state may be determined using connected vehicle applications. Connected vehicle applications enable support for intelligent transportation systems (ITS). In general, ITS are advanced applications integrating telecommunications, electronics, and information technologies to support connected vehicles. ITS applications apply transport engineering to plan, design, operate, maintain, and manage transport systems of a connected vehicle. In particular, these ITS applications provide improved user information and increased safety by coordinating 'smarter' use of transport networks.

Connected vehicle applications support vehicle-to-vehicle (V2V) communications and vehicle-to-infrastructure (V2I) with wireless technology using V2V communications or V2I communications. For example V2V communications use wireless signals to send information back and forth between other connected vehicles (e.g., location, speed, and/or direction). Conversely, V2I communications involve vehicle to infrastructure (e.g., road signs or traffic signals) communications, generally involving vehicle safety issues. For example, V2I communications may request traffic information from a traffic management system to determine best possible routes. V2V and V2I applications for connected vehicles dramatically increase automotive safety by transforming vehicle operation.

According to aspects of the present disclosure, the current traffic state may be determined using a roadside unit (RSU) accessed using V2I (vehicle-to-infrastructure) services. Conventionally, most RSUs are installed in fixed locations or physically integrated with existing infrastructure (e.g., traffic lights). Fixed RSUs generally provide a fixed set of V2I services, which may be used in determining a current traffic state according to aspects of the present disclosure.

In aspects of the present disclosure, a proposed system uses images of a target zone, including road data and surrounding vehicles, as well as numerical values of traffic information to form input traffic data images. This input traffic data image can be acquired by using RSUs, in-vehicle sensors, a user-owned map, as well as V2V communication. The proposed system includes a vehicle behavior controller configured to improve merging efficiency of an ego vehicle, while considering the merging ego vehicle's impact on traffic flow (e.g., highway main-lane and highway on-ramp traffic).

In aspects of the present disclosure, current and past input traffic data images (e.g., of a merging section) are used as input when selecting a target speed of a controlled vehicle. An impact of a control vehicle merging behavior on traffic flow is realized by setting an average speed of all surrounding vehicles after merging as a reward for deep reinforcement learning (RL) of a vehicle merging controller. Unfortunately, it is difficult to make a machine learning network perform appropriate feature extraction for output speed selection from the input traffic data images.

Aspects of the present disclosure improve the learning efficiency of deep reinforcement learning by using an embedded network for estimating a controlled vehicle speed. In this aspect of the present disclosure, the embedded network is configured to estimate dynamic traffic conditions (e.g., controlled vehicle speed) to a vehicle merging controller. The embedded network enables appropriate feature extraction for vehicle behavior control, which boosts a learning efficiency of the deep reinforcement learning. This system enables controlled vehicles to effectively merge onto the highway main-lane, while reducing the traffic impact on the highway main-lane and on-ramp.

FIG. 1 illustrates an example implementation of the aforementioned system and method for a vehicle behavior control system using a system-on-a-chip (SOC) 100 of an autonomous vehicle 150. The SOC 100 may include a single processor or multi-core processors (e.g., a central processing unit (CPU) 102), in accordance with certain aspects of the present disclosure. Variables (e.g., neural signals and synaptic weights), system parameters associated with a computational device (e.g., neural network with weights), delays, frequency bin information, and task information may be stored in a memory block. The memory block may be associated with a neural processing unit (NPU) 108, a CPU 102, a graphics processing unit (GPU) 104, a digital signal processor (DSP) 106, a dedicated memory block 118, or may be distributed across multiple blocks. Instructions executed at a processor (e.g., CPU 102) may be loaded from a program memory associated with the CPU 102 or may be loaded from the dedicated memory block 118.

The SOC 100 may also include additional processing blocks configured to perform specific functions, such as the GPU 104, the DSP 106, and a connectivity block 110, which may include fifth generation (5G) cellular network technology, fourth generation long term evolution (4G LTE) connectivity, unlicensed WiFi connectivity, USB connectivity, Bluetooth® connectivity, and the like. In addition, a multimedia processor 112 in combination with a display 130 may, for example, apply a current traffic state to select a vehicle behavior control action, according to the display 130 illustrating a view of a vehicle. In some aspects, the NPU 108 may be implemented in the CPU 102, DSP 106, and/or GPU 104. The SOC 100 may further include a sensor processor 114, image signal processors (ISPs) 116, and/or navigation 120, which may, for instance, include a global positioning system.

The SOC 100 may be based on an Advanced Risk Machine (ARM) instruction set or the like. In another aspect of the present disclosure, the SOC 100 may be a server computer in communication with the autonomous vehicle 150. In this arrangement, the autonomous vehicle 150 may include a processor and other features of the SOC 100. In this aspect of the present disclosure, instructions loaded into a processor (e.g., CPU 102) or the NPU 108 of the autonomous vehicle 150 may include code for feeding an input of a feature extraction network of the vehicle behavior controller with a sequence of images of a highway section and corresponding traffic data captured by the sensor processor 114. The instructions loaded into a processor (e.g., CPU 102) may also include code for planning and control (e.g., an estimated behavior of a controlled, ego vehicle) select an action to adjust an autonomous behavior of the controlled ego vehicle according to the estimated behavior of the controlled ego vehicle in response to traffic state information detected/recognized in the region of interest in the image captured by the sensor processor 114.

Figure 2:
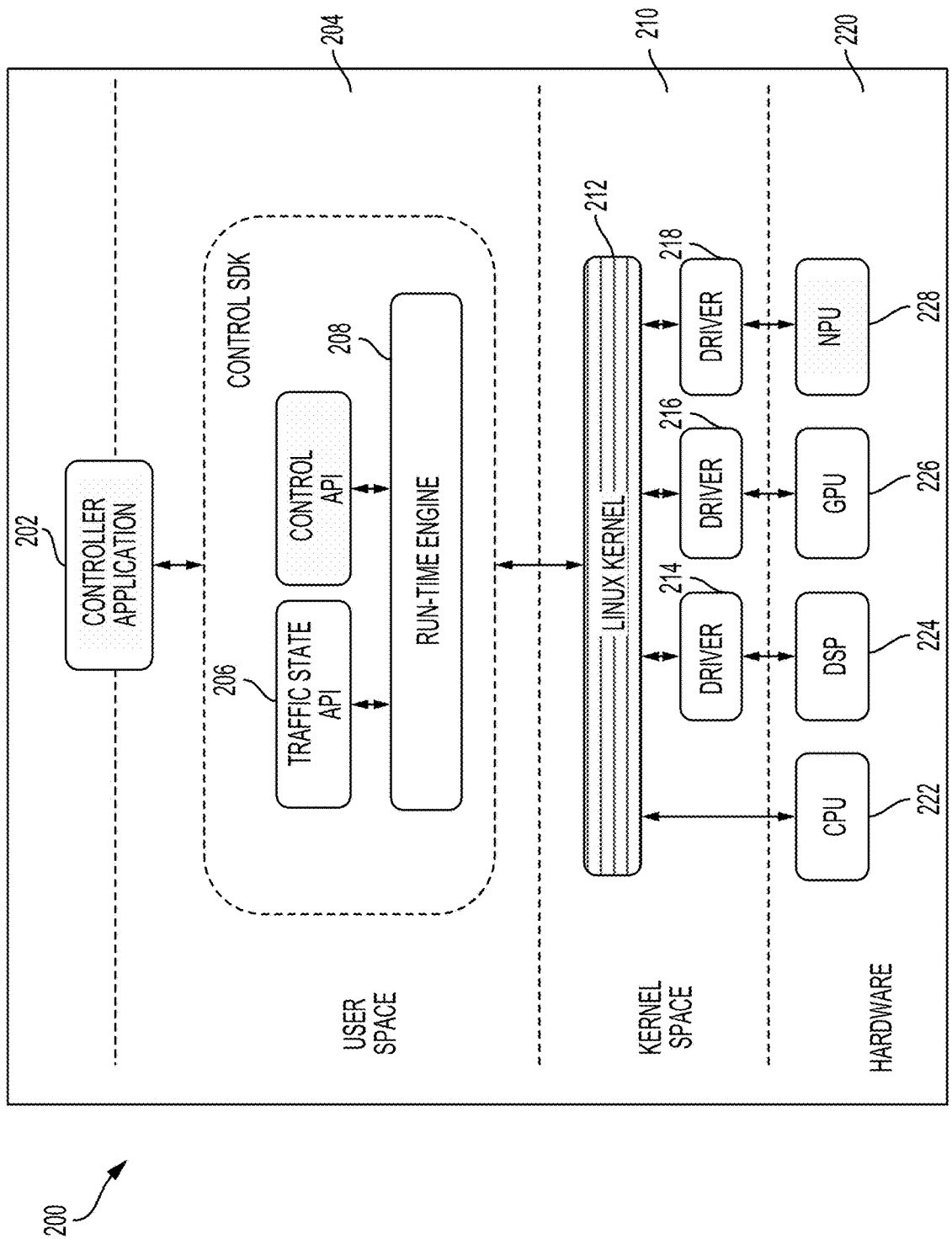
FIG. 2 is a block diagram illustrating a software architecture that may modularize artificial intelligence (AI) functions for a vehicle behavior control system of an autonomous agent, according to aspects of the present disclosure.

FIG. 2 is a block diagram illustrating a software architecture 200 that may modularize artificial intelligence (AI) functions for selecting a vehicle control action of an autonomous agent using current traffic state information, according to aspects of the present disclosure. Using the architecture, a controller application 202 may be designed such that it may cause various processing blocks of an SOC 220 (for example a CPU 222, a DSP 224, a GPU 226, and/or an NPU 228) to perform supporting computations during run-time operation of the controller application 202. While FIG. 2 describes the software architecture 200 for selecting a vehicle control action of an autonomous agent, it should be recognized that vehicle action control functionality is not limited to autonomous agents. According to aspects of the present disclosure, vehicle action control functionality is applicable to any vehicle type, provided the vehicle is equipped with appropriate functions (e.g., vehicle-to-vehicle (V2V) and vehicle-to-infrastructure (V2I)) of connected vehicle applications.

The controller application 202 may be configured to call functions defined in a user space 204 that may, for example, provide for vehicle action control services. The controller application 202 may make a request to compile program code associated with a library defined in a traffic state application programming interface (API) 206 to perform a vehicle behavior action control selection. Selection of the vehicle behavior control action may ultimately rely on the output of a convolutional neural network configured to focus on portions of the sequence of images critical to selecting the vehicle behavior control action.

A run-time engine 208, which may be compiled code of a runtime framework, may be further accessible to the controller application 202. The controller application 202 may cause the run-time engine 208, for example, to take actions for controlling the autonomous agent. When an ego vehicle is merging onto a traffic lane, the run-time engine 208 may in turn send a signal to an operating system 210, such as a Linux Kernel 212, running on the SOC 220. FIG. 2 illustrates the Linux Kernel 212 as software architecture for implementing control of an autonomous agent using current traffic state information. It should be recognized, however, aspects of the present disclosure are not limited to this exemplary software architecture. For example, other kernels may be used to provide the software architecture to support vehicle control action selection functionality.

The operating system 210, in turn, may cause a computation to be performed on the CPU 222, the DSP 224, the GPU 226, the NPU 228, or some combination thereof. The CPU 222 may be accessed directly by the operating system 210, and other processing blocks may be accessed through a driver, such as drivers 214-218 for the DSP 224, for the GPU 226, or for the NPU 228. In the illustrated example, the deep neural network may be configured to run on a combination of processing blocks, such as the CPU 222 and the GPU 226, or may be run on the NPU 228, if present.

Figure 3:
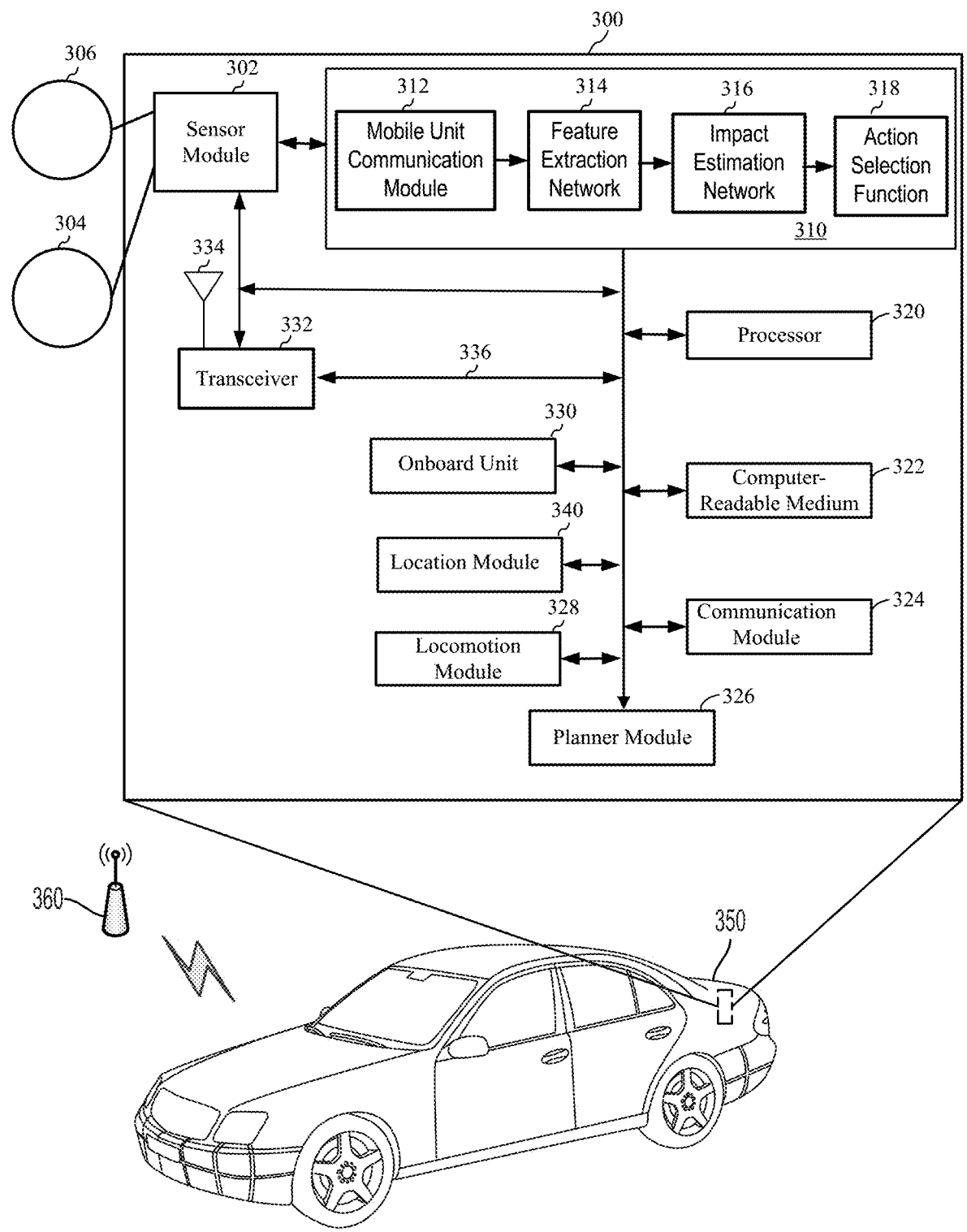
FIG. 3 is a diagram illustrating an example of a hardware implementation for a vehicle behavior control system, according to aspects of the present disclosure.

FIG. 3 is a diagram illustrating an example of a hardware implementation for a vehicle behavior control system 300, according to aspects of the present disclosure. The vehicle behavior control system 300 may be configured for improved merging efficiency of an ego vehicle. The vehicle behavior control system 300 may be a component of a vehicle, a robotic device, or other non-autonomous device (e.g., non-autonomous vehicles, ride-share cars, etc.). For example, as shown in FIG. 3, the vehicle behavior control system 300 is a component of a car 350. Aspects of the present disclosure are not limited to the vehicle behavior control system 300 being a component of the car 350. Other devices, such as a bus, motorcycle, or other like non-autonomous vehicle, are also contemplated for implementing the vehicle behavior control system 300. In this example, the car 350 may be autonomous or semi-autonomous; however, other configurations for the car 350 are contemplated.

The vehicle behavior control system 300 may be implemented with an interconnected architecture, represented generally by an interconnect 336. The interconnect 336 may include any number of point-to-point interconnects, buses, and/or bridges depending on the specific application of the vehicle behavior control system 300 and the overall design constraints. The interconnect 336 links together various circuits including one or more processors and/or hardware modules, represented by a sensor module 302, a vehicle behavior controller 310, a processor 320, a computer-readable medium 322, a communication module 324, a planner module 326, a locomotion module 328, an onboard unit 330, and a location module 340. The interconnect 336 may also link various other circuits such as timing sources, peripherals, voltage regulators, and power management circuits, which are well known in the art, and therefore, will not be described any further.

The vehicle behavior control system 300 includes a transceiver 332 coupled to the sensor module 302, the vehicle behavior controller 310, the processor 320, the computer-readable medium 322, the communication module 324, the planner module 326, the locomotion module 328, the location module 340, and the onboard unit 330. The transceiver 332 is coupled to antenna 334. The transceiver 332 communicates with various other devices over a transmission medium. For example, the transceiver 332 may receive commands via transmissions from a user or a connected vehicle. In this example, the transceiver 332 may receive/transmit V2V and V2I traffic state information for the vehicle behavior controller 310 to/from connected vehicles within the vicinity of the car 350.

The vehicle behavior control system 300 includes the processor 320 coupled to the computer-readable medium 322. The processor 320 performs processing, including the execution of software stored on the computer-readable medium 322 to provide functionality according to the disclosure. The software, when executed by the processor 320, causes the vehicle behavior control system 300 to perform the various functions described for vehicle behavior control (e.g., vehicle merging control) of the car 350, or any of the modules (e.g., 302, 310, 324, 326, 328, 330, and/or 340). The computer-readable medium 322 may also be used for storing data that is manipulated by the processor 320 when executing the software.

The sensor module 302 may obtain measurements via different sensors, such as a first sensor 306 and a second sensor 304. The first sensor 306 may be a vision sensor (e.g., a stereoscopic camera or a red-green-blue (RGB) camera) for capturing 2D images. The second sensor 304 may be a ranging sensor, such as a light detection and ranging (LiDAR) sensor or a radio detection and ranging (RADAR) sensor. Of course, aspects of the present disclosure are not limited to the aforementioned sensors as other types of sensors (e.g., thermal, sonar, and/or lasers) are also contemplated for either of the first sensor 306 or the second sensor 304.

The measurements of the first sensor 306 and the second sensor 304 may be processed by the processor 320, the sensor module 302, the vehicle behavior controller 310, the communication module 324, the planner module 326, the locomotion module 328, the onboard unit 330, and/or the location module 340. In conjunction with the computer-readable medium 322, the measurements of the first sensor 306 and the second sensor 304 are processed to implement the functionality described herein. In one configuration, the data captured by the first sensor 306 and the second sensor 304 may be transmitted to a connected vehicle via the transceiver 332. The first sensor 306 and the second sensor 304 may be coupled to the car 350 or may be in communication with the car 350.

The location module 340 may determine a location of the car 350. For example, the location module 340 may use a global positioning system (GPS) to determine the location of the car 350. The location module 340 may implement a dedicated short-range communication (DSRC)-compliant GPS unit. A DSRC-compliant GPS unit includes hardware and software to make the car 350 and/or the location module 340 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); and EN ISO 14906:2004 Electronic Fee Collection—Application interface.

A DSRC-compliant GPS unit within the location module 340 is operable to provide GPS data describing the location of the car 350 with space-level accuracy for accurately dispatching the car 350 to a scene involving on-demand RSU services. For example, the car 350 is parked in a predetermined location of the scene for providing on-demand RSU services during a temporary event (e.g., a marathon). Space-level accuracy means the location of the car 350 is described by the GPS data sufficient to confirm a location of the car 350 parking space. That is, the location of the car 350 within the scene is accurately determined with space-level accuracy based on the GPS data from the car 350.

The communication module 324 may facilitate communications via the transceiver 332. For example, the communication module 324 may be configured to provide communication capabilities via different wireless protocols, such as 5G, WiFi, long term evolution (LTE), 4G, 3G, etc. The communication module 324 may also communicate with other components of the car 350 that are not modules of the vehicle behavior control system 300. The transceiver 332 may be a communications channel through a network access point 360. The communications channel may include DSRC, LTE, LTE-D2D, mmWave, WiFi (infrastructure mode), WiFi (ad-hoc mode), visible light communication, TV white space communication, satellite communication, full-duplex wireless communications, or any other wireless communications protocol such as those mentioned herein.

In some configurations, the network access point 360 includes Bluetooth® communication networks or a cellular communications network for sending and receiving data including via short messaging service (SMS), multimedia messaging service (MIMS), hypertext transfer protocol (HTTP), direct data connection, wireless application protocol (WAP), e-mail, DSRC, full-duplex wireless communications, mmWave, WiFi (infrastructure mode), WiFi (ad-hoc mode), visible light communication, TV white space communication, and satellite communication. The network access point 360 may also include a mobile data network that may include 3G, 4G, 5G, LTE, LTE-V2X, LTE-D2D, VoLTE, or any other mobile data network or combination of mobile data networks. Further, the network access point 360 may include one or more IEEE 802.11 wireless networks.

The vehicle behavior control system 300 also includes the planner module 326 for planning a route and controlling the locomotion of the car 350, via the locomotion module 328 for autonomous operation of the car 350. In one configuration, the planner module 326 may override a user input when the user input is expected (e.g., predicted) to cause a collision according to an autonomous level of the car 350. The modules may be software modules running in the processor 320, resident/stored in the computer-readable medium 322, and/or hardware modules coupled to the processor 320, or some combination thereof.

The National Highway Traffic Safety Administration ("NHTSA") has defined different "levels" of autonomous vehicles (e.g., Level 0, Level 1, Level 2, Level 3, Level 4, and Level 5). For example, if an autonomous vehicle has a higher level number than another autonomous vehicle (e.g., Level 3 is a higher level number than Levels 2 or 1), then the autonomous vehicle with a higher level number offers a greater combination and quantity of autonomous features relative to the vehicle with the lower level number. These different levels of autonomous vehicles are described briefly below.

Level 0: In a Level 0 vehicle, the set of advanced driver assistance system (ADAS) features installed in a vehicle provide no vehicle control, but may issue warnings to the driver of the vehicle. A vehicle which is Level 0 is not an autonomous or semi-autonomous vehicle.

Level 1: In a Level 1 vehicle, the driver is ready to take driving control of the autonomous vehicle at any time. The set of ADAS features installed in the autonomous vehicle may provide autonomous features such as: adaptive cruise control ("ACC"); parking assistance with automated steering; and lane keeping assistance ("LKA") type II, in any combination.

Level 2: In a Level 2 vehicle, the driver is obliged to detect objects and events in the roadway environment and respond if the set of ADAS features installed in the autonomous vehicle fail to respond properly (based on the driver's subjective judgement). The set of ADAS features installed in the autonomous vehicle may include accelerating, braking, and steering. In a Level 2 vehicle, the set of ADAS features installed in the autonomous vehicle can deactivate immediately upon takeover by the driver.

Level 3: In a Level 3 ADAS vehicle, within known, limited environments (such as freeways), the driver can safely turn their attention away from driving tasks, but must still be prepared to take control of the autonomous vehicle when needed.

Level 4: In a Level 4 vehicle, the set of ADAS features installed in the autonomous vehicle can control the autonomous vehicle in all but a few environments, such as severe weather. The driver of the Level 4 vehicle enables the automated system (which is comprised of the set of ADAS features installed in the vehicle) only when it is safe to do so. When the automated Level 4 vehicle is enabled, driver attention is not required for the autonomous vehicle to operate safely and consistent within accepted norms.

Level 5: In a Level 5 vehicle, other than setting the destination and starting the system, no human intervention is involved. The automated system can drive to any location where it is legal to drive and make its own decision (which may vary based on the jurisdiction where the vehicle is located).

A highly autonomous vehicle ("HAV") is an autonomous vehicle that is Level 3 or higher. Accordingly, in some configurations the car 350 is one of the following: a Level 1 autonomous vehicle; a Level 2 autonomous vehicle; a Level 3 autonomous vehicle; a Level 4 autonomous vehicle; a Level 5 autonomous vehicle; and an HAV.

The vehicle behavior controller 310 may be in communication with the sensor module 302, the processor 320, the computer-readable medium 322, the communication module 324, the planner module 326, the locomotion module 328, the location module 340, the onboard unit 330, and the transceiver 332. In one configuration, the vehicle behavior controller 310 receives sensor data from the sensor module 302. The sensor module 302 may receive the sensor data from the first sensor 306 and the second sensor 304. According to aspects of the disclosure, the sensor module 302 may filter the data to remove noise, encode the data, decode the data, merge the data, extract frames, or perform other functions. In an alternate configuration, the vehicle behavior controller 310 may receive sensor data directly from the first sensor 306 and the second sensor 304 to determine, for example, input traffic data images.

As shown in FIG. 3, the vehicle behavior controller 310 includes a mobile unit communication module 312, a feature extraction network 314, an impact estimation network 316, and an action selection function module 318. The mobile unit communication module 312, the feature extraction network 314, the impact estimation network 316, and the action selection function module 318 may be components of a same or different artificial neural network, such as a deep convolutional neural network (CNN). The vehicle behavior controller 310 is not limited to a CNN. The vehicle behavior controller 310 receives a data stream from the first sensor 306 and/or the second sensor 304. The data stream may include a 2D RGB image from the first sensor 306 and LiDAR data points from the second sensor 304. The data stream may include multiple frames, such as image frames of traffic data.

The mobile unit communication module 312 may be configured to communicate with other connected vehicles within proximity of the car to determine traffic state information, such as input traffic state images. For example, a merging behavior of the car 350 may be controlled by the vehicle behavior controller 310 in a manner that maintains a current speed of surrounding, connected vehicles on a highway, for example, as shown in FIG. 4.

Figure 4:
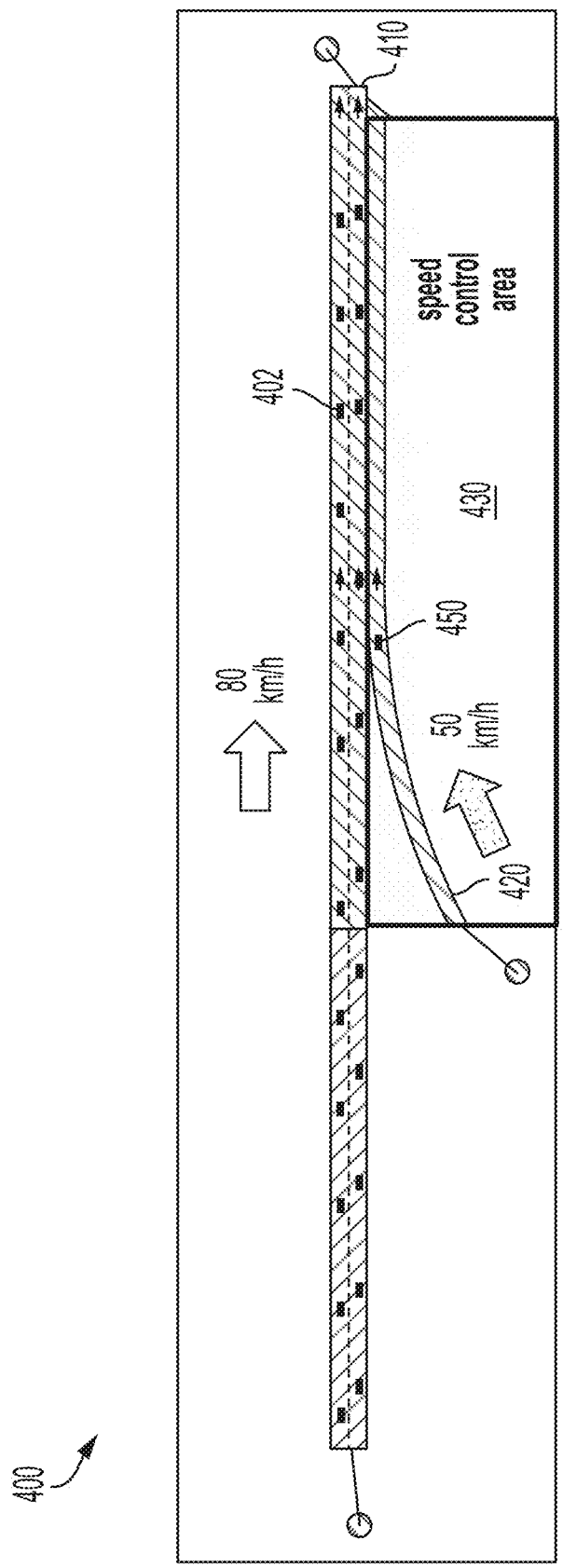
FIG. 4 is a diagram illustrating an overview of a highway environment, including connected vehicles on a highway main-lane and a controlled merging ego vehicle on a highway on-ramp, according to aspects of the present disclosure.

FIG. 4 is a diagram illustrating an overview of a highway environment, including connected vehicles on a highway main-lane and a controlled merging ego vehicle on a highway on-ramp, according to aspects of the present disclosure. The highway environment 400 includes a highway main-lane 410 having connected vehicles 402, and a highway on-ramp 420 having a connected merging-vehicle (e.g., a controlled, ego vehicle 450. In this example, the highway environment 400 shows a merging section of a highway. In this configuration, the connected vehicles 402 are configured to monitor the dynamics of both vehicles on the highway main-lane 410, as well as vehicles on the highway on-ramp 420. In this example, the connected vehicles 402, as well as the controlled, ego vehicle 450, may be the car 350, shown in FIG. 3.

In one aspect of the present disclosure, the highway environment 400 represents a simulation in which the controlled, ego vehicle 450 is essentially controlled by a simulator vehicle controller (e.g., the vehicle behavior controller 310); however, a speed of a connected merging-vehicle (e.g., the controlled, ego vehicle 450) is selected by a deep merging vehicle controller. For example, the deep merging vehicle controller adjusts a speed of the controlled, ego vehicle 450 to efficiently and smoothly merge into traffic on the highway main-lane 410 from the highway on-ramp 420. In this example, if the target speed of the controlled, ego vehicle 450 is not safe, the simulator vehicle controller ignores the target speed. Therefore, a collision avoidance function is guaranteed by the simulator vehicle controller.

As shown in FIG. 4, the connected vehicles 402 on the highway main-lane 410 are also controlled by the simulator vehicle controller (e.g., the vehicle behavior controller 310 of FIG. 3). In this example, the controlled, ego vehicle 450 enters the highway on-ramp 420 at 50 kilometers (km) per hour (km/h), while a speed of the connected vehicles 402 is maintained at 80 km/h. Subsequently, the speed of the controlled, ego vehicle 450 (e.g., connected merging-vehicle) is controlled in a speed control area 430 by the deep merging vehicle controller. The deep merging vehicle controller controls the speed until the controlled, ego vehicle 450 successfully merges onto the highway main-lane 410. In this example, a next connected merging-vehicle is generated after the controlled, ego vehicle 450 reaches the end of the highway main-lane 410.

Figure 5A:
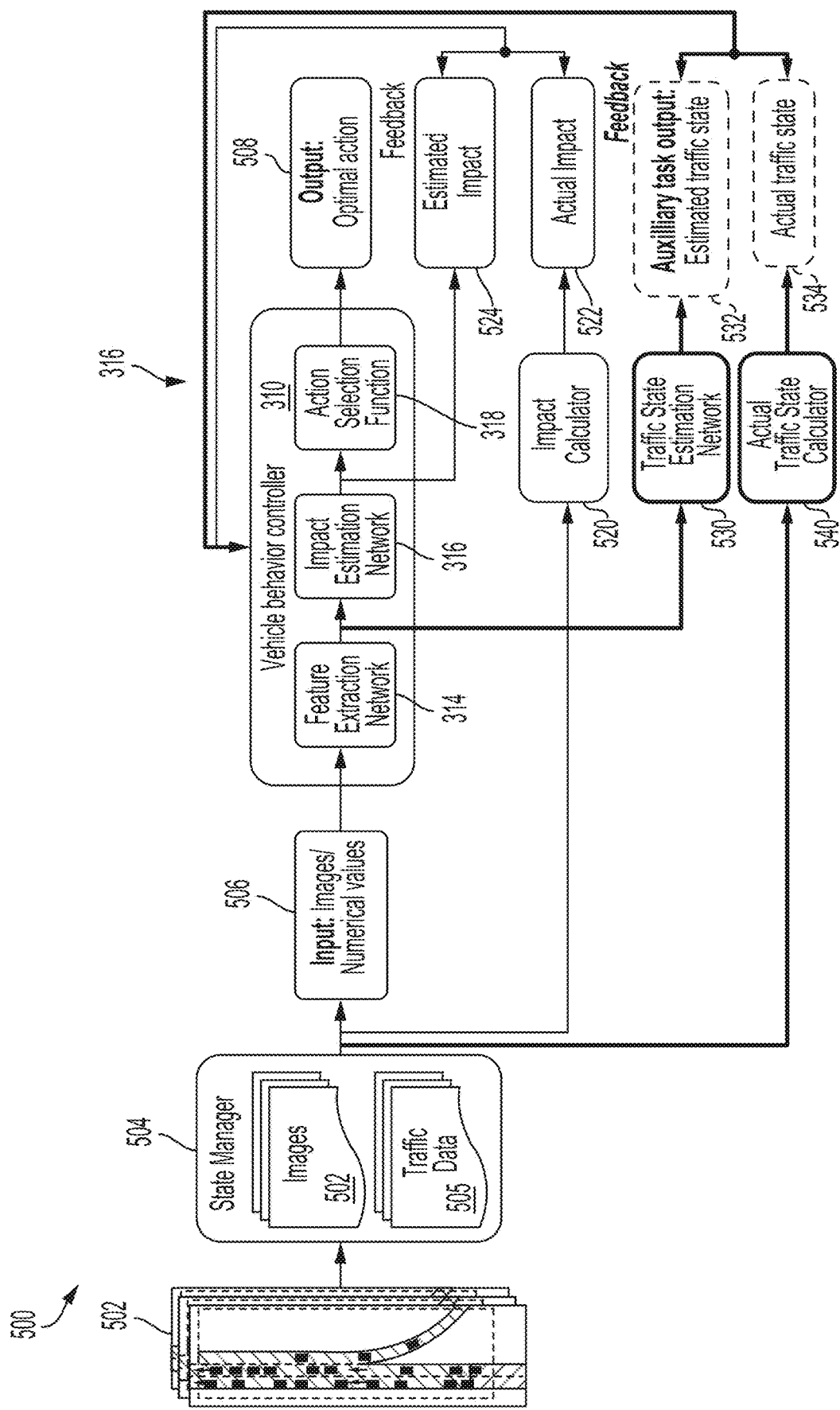
FIGS. 5A and 5B illustrate training and implementation of the vehicle behavior control system of FIG. 3, according to aspects of the present disclosure.
Figure 5B:
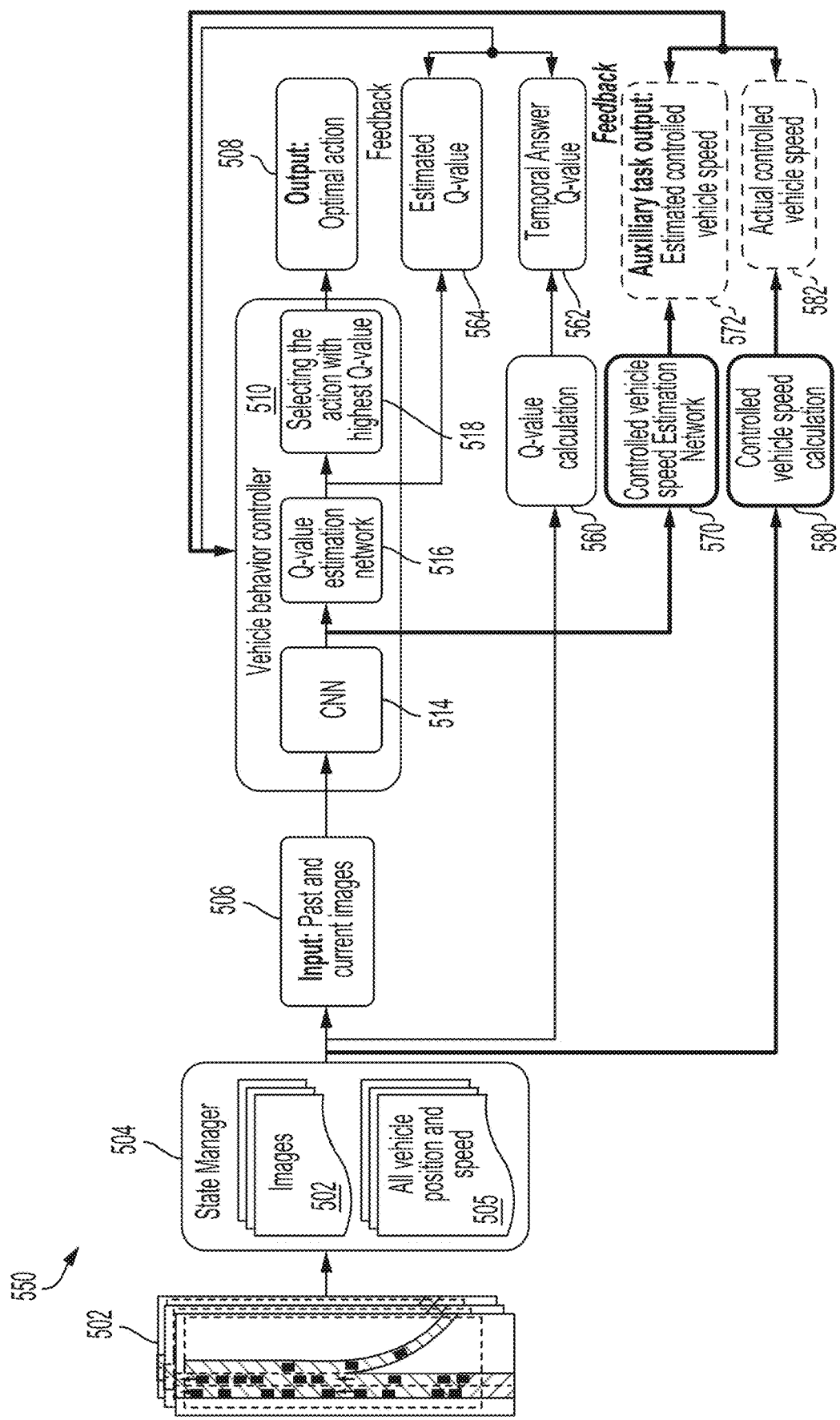

FIGS. 5A and 5B illustrate training and implementation of the vehicle behavior control system of FIG. 3, according to aspects of the present disclosure. As shown in FIGS. 5A and 5B, the proposed vehicle behavior control system 500/550 uses images of the target zone, including road data and surrounding vehicles, as well as numerical values of traffic information as an input. This image or traffic data can be acquired by using a road side unit or RSU, in-vehicle sensors, a user owned map, as well as V2V communication.

FIG. 5A further illustrates the vehicle behavior controller 310 of FIG. 3 during a training stage process. In this configuration, the vehicle behavior controller 310 includes an input 506 that receives images 502 and traffic data 505 from a state manager 504 to feed the feature extraction network 314. In this training stage, the feature extraction network 314 in vehicle behavior controller 310 (e.g., a convolutional neural network (CNN)) is fed with a sequence of the images 502 (e.g., of the highway environment 400) and/or numerical values of the traffic data 505 from the state manager 504. The sequence of the images 502 as well as the numerical values of the traffic data 505 are fed to the feature extraction network 314 as the states from the state manager 504 to represent traffic conditions.

In the training stage configuration of FIG. 5A, the vehicle behavior controller 310 is supplemented with a traffic state estimation network 530 and an actual traffic state calculator 540. In this configuration, the traffic state estimation network 530 disentangles an estimated traffic state (e.g., auxiliary task output 532) from the features extracted from the input 506 of the vehicle behavior controller 310. For example, a current and/or future position, a speed and/or a density of vehicles can be applied to the estimated traffic state (e.g., 532). This enables the feature extraction network 314 to explicitly understand the state of the surrounding environment (including controlled vehicles, surrounding vehicles, and road information). Subsequently, the impact estimation network 316 disentangles the estimated impact 524 from the extracted features. For example, a Q-value of each action (e.g., a weighted sum of the expected rewards of all future steps starting from the current state) can be applied to the estimated impact 524 by the impact calculator 520.

As further illustrated in FIG. 5A, the action selection function module 318 of the vehicle behavior controller 310 selects the optimal action at an output 508 by using the estimated impact 524. An actual impact 522 and an actual traffic state 534 are calculated from the images 502 and the traffic data 505 received from the state manager 504 at the input 506 of the vehicle behavior controller 310. In addition, an error between the estimated impact 524 and the estimated traffic state (e.g, 532) is fed back to update the impact estimation network 316 of the vehicle behavior controller 310. Training of the vehicle behavior controller 310 may be performed 1.4 million times using a traffic flow simulator, such as the highway environment 400, shown in FIG. 4.

FIG. 5B illustrates an implementation of a trained vehicle behavior controller, according to aspects of the present disclosure. In this trained configuration, an optimal action is provided at the output 508, as selected from the input 506 using the pre-trained vehicle behavior controller 510 such as, for example, the vehicle behavior controller 310 of FIG. 3. In this configuration, the pre-trained vehicle behavior controller enables a controlled, ego vehicle 450 (e.g., a connected merging-vehicle) to enter the highway main-lane effectively from the highway on-ramp, while minimizing an impact to traffic on the highway main-lane 410, as shown in FIG. 4.

In the implementation configuration of FIG. 5B, the pre-trained vehicle behavior controller 510 is supplemented with a controlled vehicle speed estimation network 570 and a controlled vehicle speed calculation 580. In this configuration, the controlled vehicle speed estimation network 570 includes an auxiliary task output 572 to provide an estimated controlled vehicle speed. In addition, the controlled vehicle speed calculation 580 provides the actual controlled vehicle speed 582. The pre-trained vehicle behavior controller 510 includes a convolutional neural network (CNN) 514 as the feature extraction network 314 of FIG. 5A. In addition, a Q-value estimation network 516 implements the impact estimation network 316, and a block for selecting the action with the highest Q-value 518 is used as the action selection function module 318 of FIG. 5A.

The pre-trained vehicle behavior controller 510 implements the impact calculator 520 of FIG. 5A using a Q-value calculation 560. In this example, an estimated Q-value 564 is provided by the Q-value estimation network 516. In addition, a Q-value of each action (e.g., a weighted sum of the expected rewards of all future steps starting from the current state) can be applied to a temporal answer Q-value 562 by the Q-value calculation 560. In this configuration, an error between the estimated Q-value 564 from the Q-value estimation network 516 and the temporal answer Q-value 562 is provided as feedback to the Q-value estimation network 516. Although illustrated as providing Q-value feedback to the Q-value estimation network 516, it should be recognized that other implementations without feedback are possible to simplify implementation.

As further illustrated in FIG. 5B, the block for selecting the action with the highest Q-value 518 of the pre-trained vehicle behavior controller 510 selects the optimal action at the output 508. In this configuration, the controlled vehicle speed estimation network 570 includes the auxiliary task output 572 to provide the estimated controlled vehicle speed. In addition, the controlled vehicle speed calculation 580 provides the actual controlled vehicle speed 582. The actual controlled vehicle speed 582 and the temporal answer Q-value 562 are calculated from the images 502 and the traffic data 505 received from the state manager 504 at the input 506 of the pre-trained vehicle behavior controller 510. The error between the estimated Q-value 564 and the temporal answer Q-value 562, as well as the actual controlled vehicle speed 582 (e.g., actual speed of the ego vehicle) and the estimated controlled vehicle speed (e.g, 572) are fed back to update the Q-value estimation network 516 of the pre-trained vehicle behavior controller 510 to adjust the Q-values of each action to enable selection of the optimal action at output 508.

Figure 6:
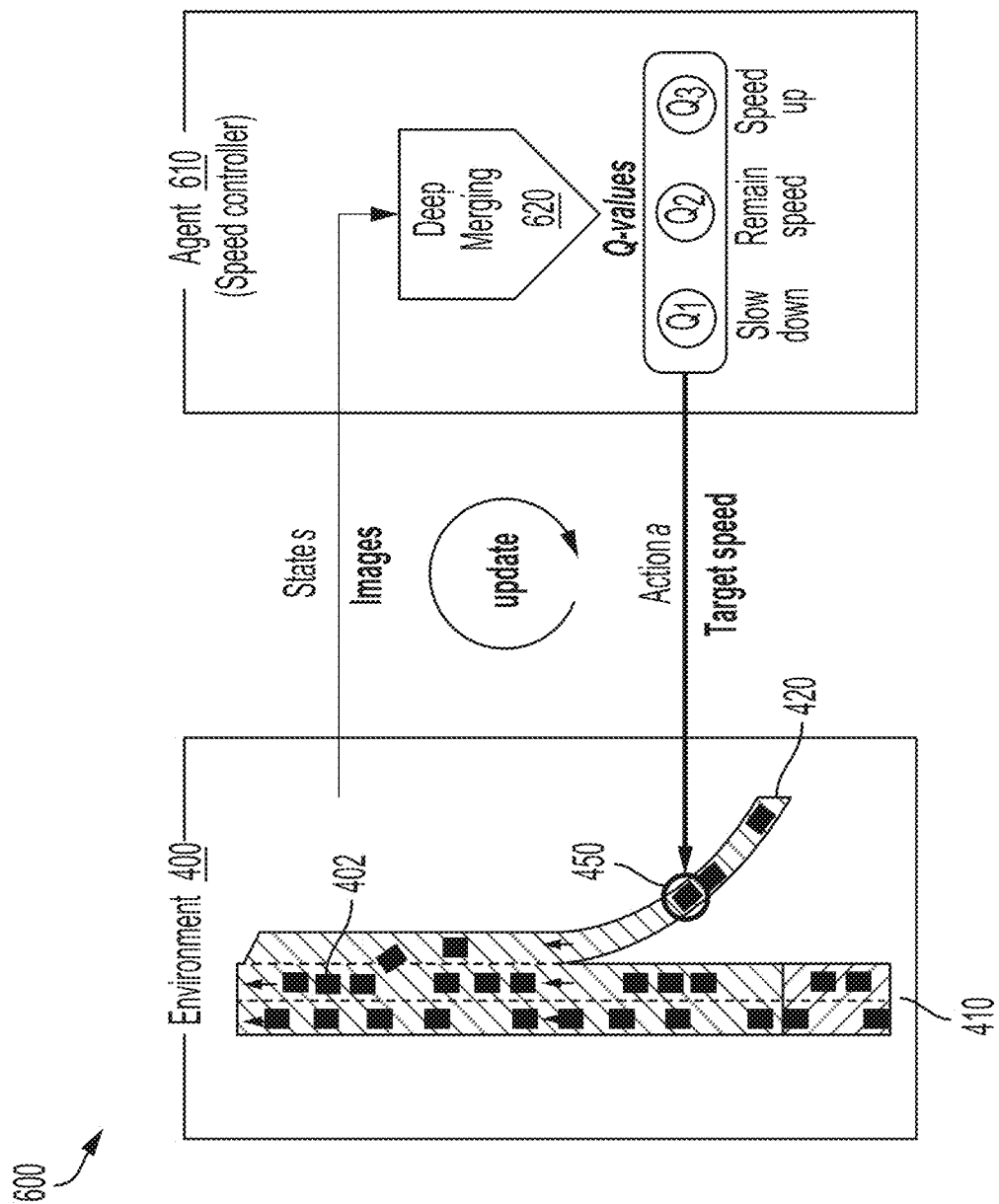
FIG. 6 is a block diagram illustrating efficient merging of a controlled merging-vehicle using deep reinforcement learning (RL), according to one aspect of the present disclosure.

FIG. 6 is a block diagram illustrating a vehicle behavior control system 600, supporting efficient merging of a controlled merging-vehicle (e.g., ego vehicle 450) using deep reinforcement learning (RL), according to one aspect of the present disclosure. In this example, an input state s, an action α and reward r are set as follows: (a) input state: current and past images; (B) action: acceleration ($Q_3$), speed maintenance ($Q_2$), and deceleration ($Q_3$); and (C) reward: highway main-lane average speed after the controlled vehicle merges. The reward is used in Q-value calculation. In this implementation of the vehicle behavior control system 600, the controlled, ego vehicle speed is estimated as an auxiliary traffic state estimation task, such as an embedded network (see FIG. 9) using reinforcement learning. In one configuration, three actions for speed control are provided (e.g., −0.3 G, 0 G, +0.3 G). This to reduce number of available actions avoids delayed convergence of the deep merging network 620. In this example, an upper limit (e.g., 0.3 G) of general acceleration is adopted, although other values are possible according to a desired implementation.

Deep Reinforcement Learning

In the present reinforcement learning problem of FIG. 6, an agent 610 (e.g., speed controller) and the highway environment 400 interact at discrete time steps, in which the highway environment 400 may be formulated as a Markov Decision Process (MDP). The agent 610 observes state s ∈S and selects an action a ∈A according to its policy π. Then, the highway environment 400 responds to the action and presents a new state s' ∈S, in which the agent 610 observes the reward r. In the present disclosure, traffic conditions are approximated as a Markov Decision Process by using a traffic simulator, such as the traffic simulator described with reference to the highway environment 400 of FIG. 4.

In this configuration, the agent 610 aims to maximize expected discounted return, which is defined:

$$R = \Sigma_{\tau=t}^{\infty} \gamma^{\tau-t} r_\tau \tag{1}$$

where y is a discount factor y ∈(0,1] that trades off the importance of immediate and future rewards. Furthermore, considering a stochastic policy π, according to which the agent 610 behaves, the value of the state-action pair (s, α) and the value of the state s are defined as follows:

$$Q^\pi(s, \alpha) = E[R_t | s_t = s, \alpha_t = \alpha, \pi] \tag{2}$$

$$V^\pi(s) = E_{\alpha \sim \pi(s)}[Q^\pi(s, \alpha)] \tag{3}$$

Using dynamic programming, the state-action value function (e.g., Q-function) can be recursively computed as:

$$Q^\pi(s, \alpha) = E_{s'}[r + \gamma E_{\alpha' \sim \pi(s')}[Q^\pi(s', \alpha')] | s, \alpha, \pi] \tag{4}$$

Optimal Q-function $Q^*(s, \alpha) = \max Q^\pi(s, \alpha)$, and the optimal policy $$a = \underset{a' \in A}{\operatorname{argmax}} Q^*(s, a')^\pi$$

Consequently, the optimal Q-function satisfies the Bellman equation:

$$Q^*(s, a) = E_{s'}[r + \gamma \max_{a'} Q^*(s', a') \mid s, a] \quad (5)$$

Usually the value function is highly dimensional, and difficult to manually formulate. Consequently, the value function is represented using an approximation, such as a neural network. In aspects of the present disclosure, a deep merging network 620 of the agent 610 is implemented as a deep-Q network (DQN) implementing a deep reinforcement learning algorithm. In addition, a double DQN (DDQN) as well as a dueling DDQN (DDDQN) architecture may implement the deep merging network 620 to improve learning stability and convergence speed of this reinforcement learning problem. In the DQN approach, the deep merging network 620 is used for Q-value approximation. The vehicle behavior control system 600 provides a network architecture to perform the deep merging network 620, as shown in FIG. 6. The agent 610 may be configured to reduce the following loss function (θ):

$$L(\theta) = E_{s,a,r,s'}\left[(y^{DQN} - Q(s, a; \theta))^2\right] \quad (6)$$

$$y^{DQN} = r + \gamma \max_{a'} Q(s', a'; \theta^-) \quad (7)$$

where θ is the parameter of the network, and θ⁻ is the parameter of the fixed and separate network, called target network. In a double DQN configuration of the deep merging network 620, overestimation of Q-value is performed to reduce the overestimation of Q-value, the $y^{DQN}$ as follows:

$$y^{DQN} = r + \gamma Q\left(s', \operatorname{argmax}_{a'} Q(s', a'; \theta); \theta^-\right) \quad (8)$$

Figure 7:
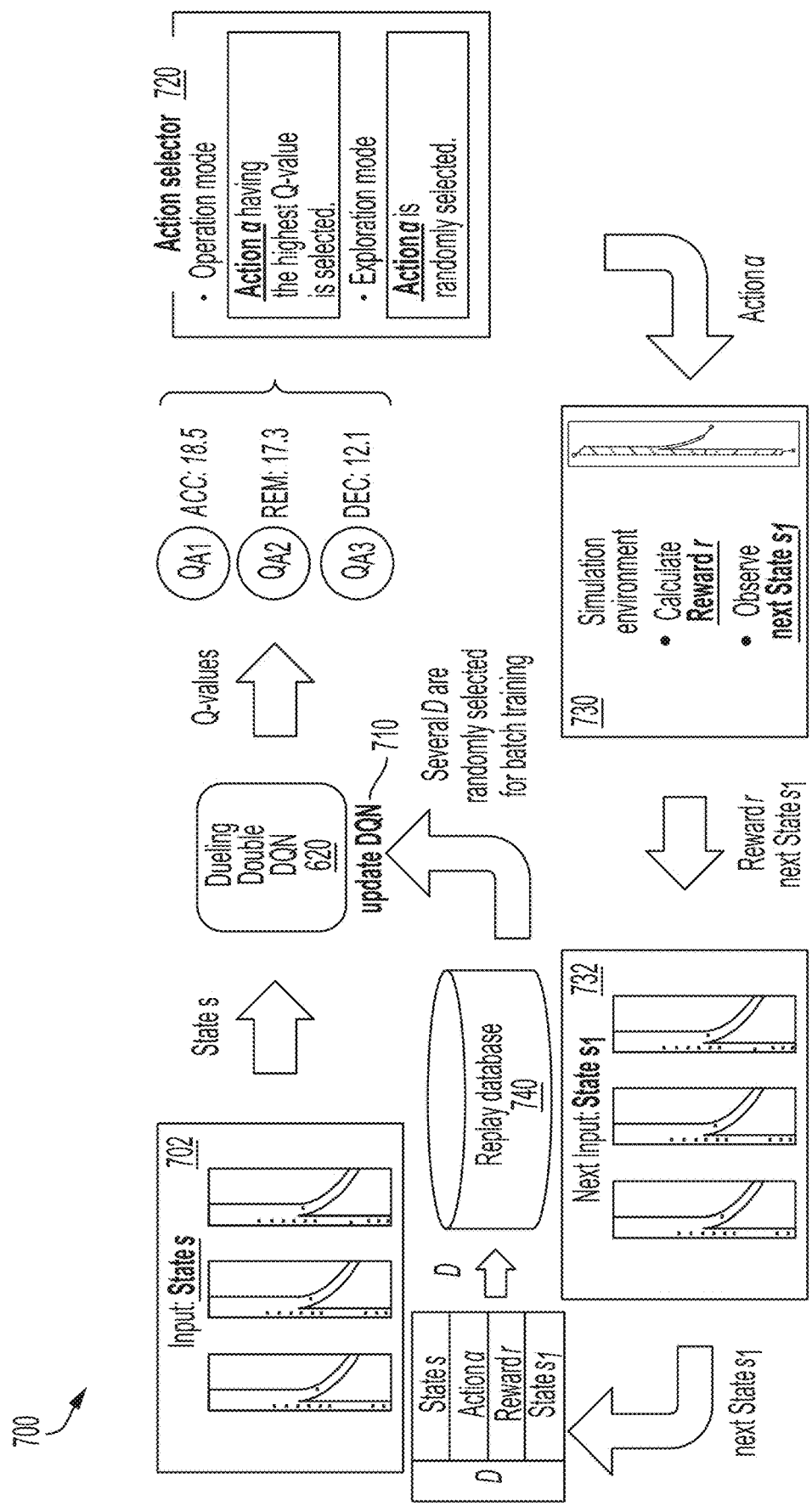
FIG. 7 is a block diagram illustrating training of the speed controller agent of FIG. 6, according to aspects of the present disclosure.

FIG. 7 is a block diagram illustrating a training process 700 of the agent 610 of FIG. 6, according to aspects of the present disclosure. This DQN configuration of the deep merging network 620 also introduces experience replay (e.g., replay database 740) to successfully train the deep merging network 620. That is, during training of the deep merging network 620 (e.g., Q-network), instead of using the current experience in standard temporal-difference learning (TD-learning), the deep merging network 620 is trained by sampling (e.g., uniformly at random) mini-batches of experiences s, α, r, s' from the experience replay memory (e.g., replay database 740).

The training process 700 of the agent 610 of FIG. 6 begins with updating the deep merging network 620 at block 710. In this example, the deep merging network 620 receives a state s from the input 702, including input images of a merging section. In addition, the deep merging network 620 is updated with a previous state D from the replay database 740. Several previous states D may be randomly selected for batch training. Based on the current state s and one or more previous states D, the deep merging network 620 outputs Q-values. In this configuration, three options are provided: acceleration ($Q_{A1}$); maintain speed ($Q_{A2}$), and deceleration ($Q_{A3}$).

At block 720, an action selector selects one of the Q-values depending on an operation mode. For example, in an operation mode, the action selector selects the action a having the highest Q-value (e.g., acceleration $Q_{A1}$=18.5). By contrast, in an exploration mode, the action selector selects the action a randomly. At block 730, a reward r is calculated, and a next state $s_1$ is observed. The next state $s_1$ is used to form the previous state D, which stores the current state s, the action α, the reward r, and next state $s_1$. The previous state D is stored in the replay database 740 and the process is repeated until training is complete.

Referring again to FIG. 6, to focus on the importance of taking and promoting a certain action s, the deep merging network 620 (e.g., dueling double DQN) introduces an advantage function, relating the value function and Q-functions:

$$A^\pi(s, \alpha) = Q^\pi(s, \alpha) - V^\pi(s) \quad (9)$$

$$E_{\alpha \sim \pi(s)}[A^\pi(s, \alpha)] = 0 \quad (10)$$

As a result, the Q-function can be expressed as:

$$Q(s, \alpha; \theta) = V(s; \theta) - A(s, \alpha; \theta) \quad (11)$$

Unfortunately, the equation above has an identification issue. Therefore, the modified Q-function is expressed as:

$$Q(s, a; \theta) = V(s; \theta) + A(s, a; \theta) - \frac{1}{|A|} \sum_{a'} A(s, a'; \theta) \quad (12)$$

To achieve effective merging onto the highway main-lane 410, the ego vehicle knows its own state, but also the state of its surrounding, connected vehicles. Also, the vehicle behavior control system 600, configured according to deep reinforcement learning, is given information on road shape to make the ego vehicle aware of an operating environment and a reachable area. Therefore, the deep merging network 620 uses images containing information on the road shape, surrounding, connected vehicles, and the ego vehicle. For example, the road shape may identify both the connected vehicles and the ego vehicle on a merging section of the highway.

As shown in FIG. 7, each object of the input 702, corresponding to state s, is given a different color. The input images of a merging section provided at the input 702 may be created from information collected by a roadside camera and/or onboard sensors. In the present disclosure, vehicle positions and velocities in the section defined by the state are observed. In addition, to grasp the dynamics (e.g., acceleration of the ego vehicle and surrounding, connected vehicles), the deep merging network 620 uses past (e.g., previous state D) and current images of state s as state information, such as the next input state $s_1$ (or s') 732. Increasing the number of images can provide more detailed dynamic information, but takes longer to converge. In one aspect of the present disclosure, three images are used to calculate the current connected merging-vehicle behavior (speed, acceleration and direction). For example, the three grayscale images provided at the input 702 to represent the state s are grayscale images taken at different times (e.g., −1.0, −0.5, 0.0 seconds). The grayscale images of the highway environment 400 distinguish the controlled, ego vehicle 450, the connected vehicles 402 and the highway environment using three colors (e.g., white, black, and gray).

According to aspects of the present disclosure, an action can be set as a target control value to instruct the action of the ego vehicle, such as steering angle, speed, acceleration, or control flag. In this aspect of the present disclosure, the deep merging network 620 controls the target speed by giving a target acceleration. That is, the target speed is obtained by adding the acceleration of the output to the current speed. Thus, the deep merging network 620 can adjust the merging speed and timing of the ego vehicle. Increasing the number of acceleration options can provide smoother speed control, but takes longer to converge. In this configuration, three options are provided: acceleration ($Q_{A1}$); maintain speed ($Q_{A2}$), and deceleration ($Q_{A3}$).

For example, as shown in FIG. 7, acceleration $Q_{A1}$ has a value of 18.5; maintain speed $Q_{A2}$ has a value of 17.3, and deceleration $Q_{A3}$ has a value of 12.1. The action selection varies depending on whether operating in an operation mode or an exploration mode. In this example, the action selection is in an operation mode, so the action of acceleration $Q_{A1}$ is selected.

Figure 8:
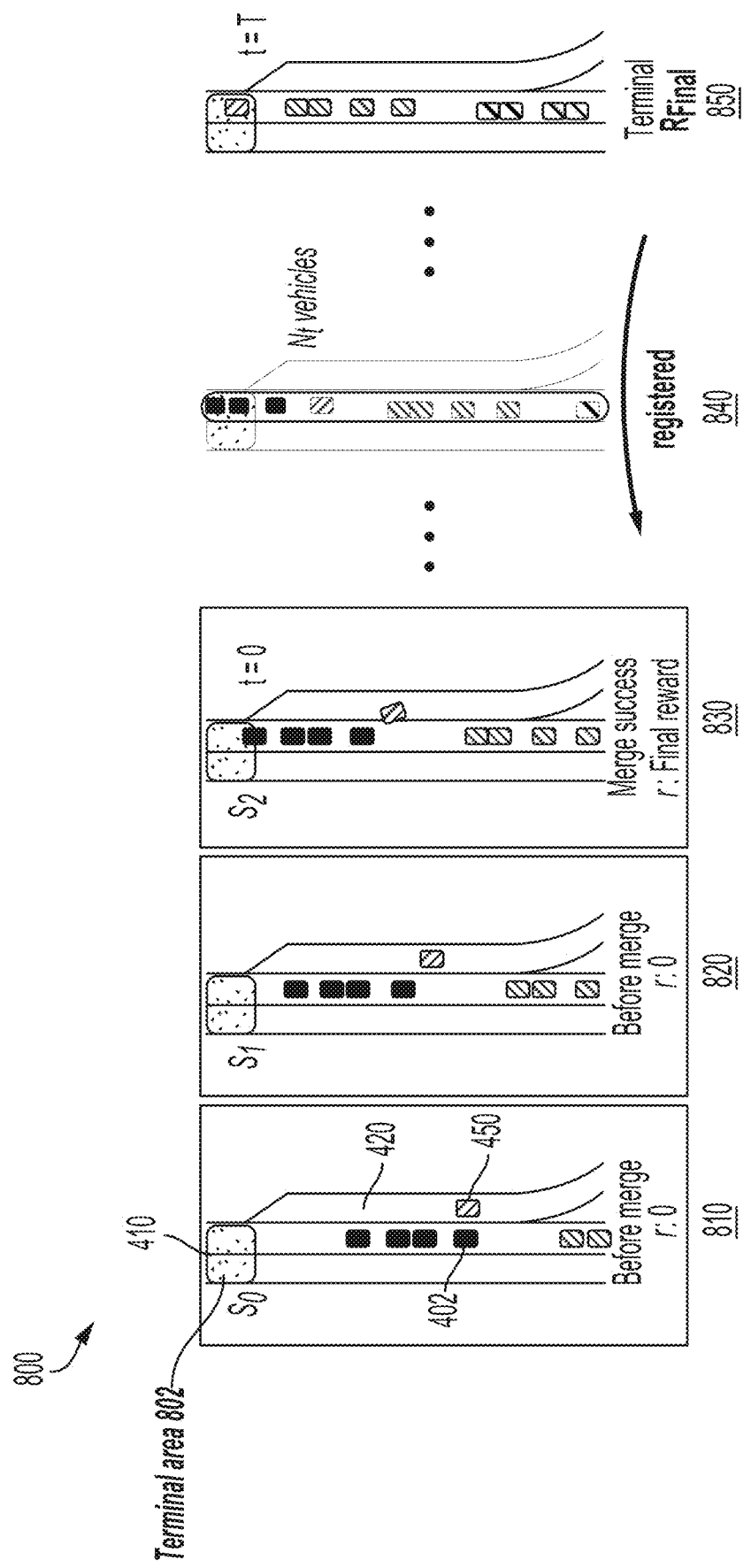
FIG. 8 is a block diagram illustrating allocation of a reward after successful merging of a controlled vehicle onto a highway main-lane, according to aspects of the present disclosure.

FIG. 8 is a block diagram 800 illustrating allocation of a reward after successful merging of a controlled, ego vehicle 450 (e.g., a connected merging-vehicle) onto a highway main-lane 410, according to aspects of the present disclosure. The agent 610 learns the action to maximize accumulated future reward. To achieve the effective merging onto the highway main-lane 410 while minimizing the traffic impact, the impact of the merging on traffic flow may be considered in a reward setting. In this aspect of the present disclosure, rewards are given when the merging is completed. That is, the reward is 0 when the controlled, ego vehicle 450 is on the highway on-ramp 420. The merging complete reward is set as the average speed of all vehicles from merging to reaching the terminal area 802 of the highway main-lane 410.

As shown in FIG. 8, at block 810, the controlled, ego vehicle 450 enters the highway on-ramp 420, before merging onto the highway main-lane at state $s_0$, and reward r=0. At block 820, a speed of the controlled, ego vehicle 450 is adjusted on the highway on-ramp 420, before merging onto the highway main-lane at state $s_1$, and reward r=0. At block 830, the speed of the controlled, ego vehicle 450 is further adjusted as the controlled, ego vehicle 450 enters the highway main-lane 410, successfully merging onto the highway main-lane at state $s_2$, and reward r=final reward for merge success. At block 840, the successful merging speed is registered based on an amount of the $N_t$ vehicles on the highway main-lane 410. At block 850, the controlled, ego vehicle 450 reaches the terminal area 802 to achieve the $R_{final}$ reward.

The merging complete reward $r_{comp}$ (e.g., $R_{final}$) is given as:

$$r_{comp} = \frac{1}{T}\sum_{t=0}^{T-1}\left(\frac{1}{N_t}\sum_{n=0}^{N_t-1}\frac{v_n^t}{V_{max}}\right)^2 \qquad (13)$$

where the T is the number of steps from merging to reaching the terminal area 802, $N_t$ is the number of connected vehicles 402 in a target section (e.g., 430) at step t, $v_n^t$ is the speed of each vehicle and $V_{max}$ is the value to normalize the speed. With this reward setting, the controlled, ego vehicle 450 adjusts its speed to increase the average speed after merging. This reward, however, is very sparse and in most situations the reward will be 0. Therefore, a certain rate of the experiences is replaced by rewarded experiences in experience replay.

Embedding Network for Deep Reinforcement Learning

Figure 9:
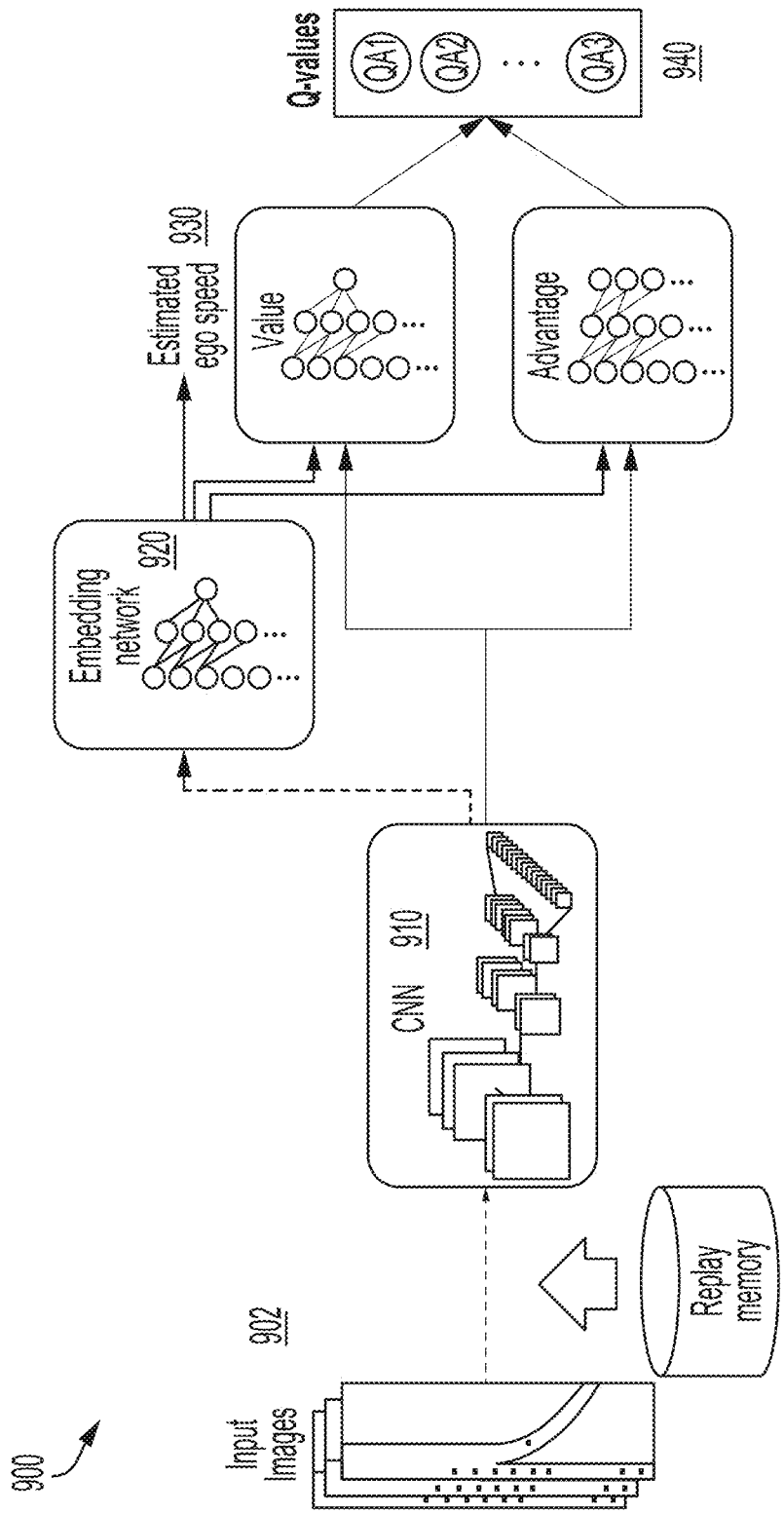
FIG. 9 illustrates a vehicle control system, including an embedding network to provide deep merging of an ego vehicle, according to aspects of the present disclosure.

FIG. 9 illustrates a vehicle control system 900, including an embedding network 920 to provide deep merging of an ego vehicle, according to aspects of the present disclosure. As shown in FIG. 9, a deep merging agent (e.g., 620) first uses a CNN 910 to extract features from input images 902, and then calculates Q-values 940 of each action. Making the deep merging network (e.g., 620) choose the appropriate output speed according to the situation involves understanding the dynamic traffic conditions of the ego vehicle and surrounding, controlled vehicles. Unfortunately, it is difficult to make the CNN 910 perform appropriate feature extraction for output speed selection from time-series image information of the input images. This may cause inadequate and slow network convergence.

Learning efficiency of deep reinforcement learning is improved by including the embedding network 920 (e.g., to estimate dynamic traffic conditions) in the deep reinforcement learning network architecture of the vehicle control system 900. In this aspect of the present disclosure, the embedding network 920 disentangles an estimated ego vehicle speed according to the reward and action settings. The estimated ego vehicle speed 930 (e.g., estimated speed) from the embedding network 920 is added as a feature for both the advantage function and the value function. The loss function for both speed estimation and Q-value estimation is given as:

$$L(\theta)=E_{s,\alpha,r,s',v_{ego}}[(y^{DQN}-Q(s,\alpha;\theta))^2+w_{emb}(v_{ego}-V_{emb}(s;\theta))] \qquad (14)$$

where $v_{ego}$ is the actual ego speed, $W_{emb}$ is a weight of the embedding network loss, and $V_{emb}$ is the function of the embedding network 920 to estimate ego speed from state s. Therefore, actual ego speed information is used for loss function calculations in the training phase, but not in the testing phase. This embedding network 920 enables the machine learning network to explicitly estimate the ego speed and to efficiently grasp the state of the ego vehicle.

Figure 10:
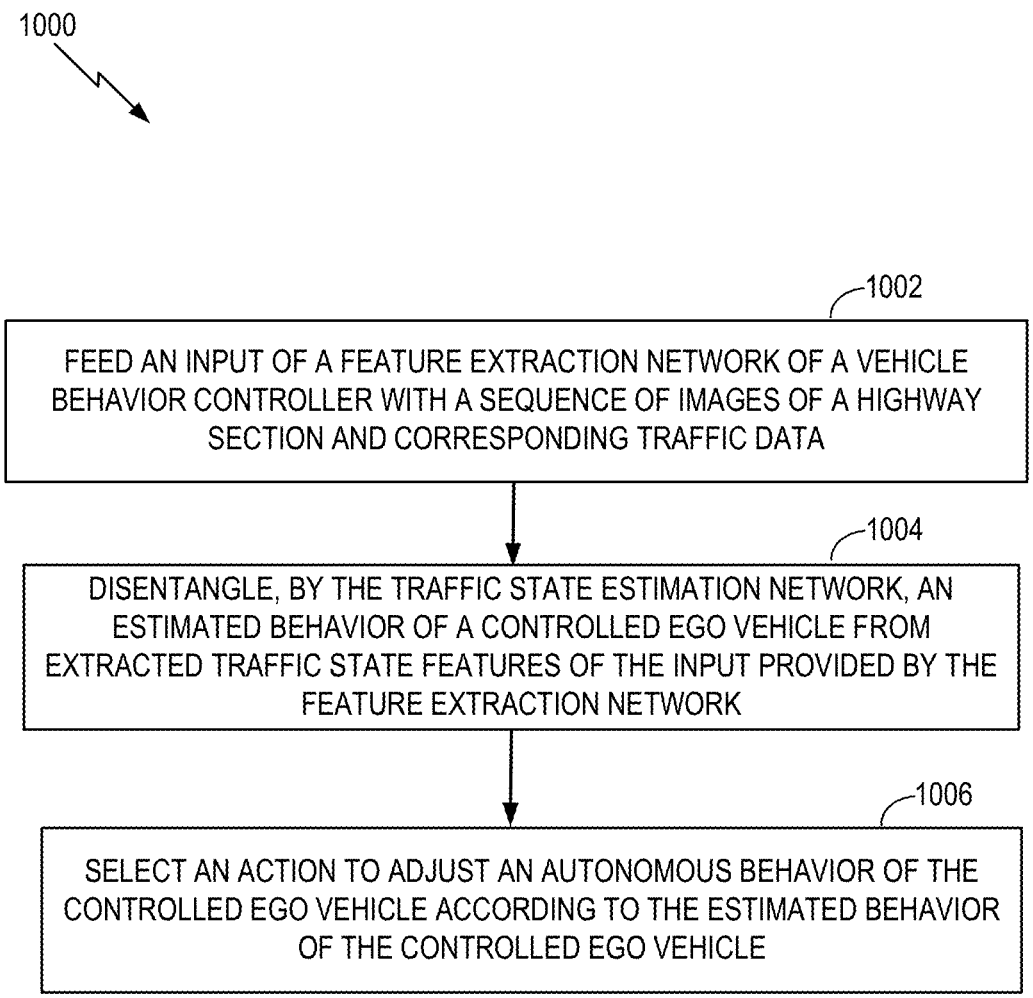
FIG. 10 is a flowchart illustrating a method improving efficiency of a vehicle behavior controller using a traffic state estimation network, according to aspects of the present disclosure.

FIG. 10 is a flowchart illustrating a method of improving efficiency of a vehicle behavior controller using a traffic state estimation network, according to aspects of the present disclosure. In one aspect of the present disclosure, a method 1000 efficiently merges a controlled merging-vehicle (e.g., controlled ego vehicle) using deep reinforcement learning (RL). At block 1002, an input of a feature extraction network of a vehicle behavior controller is fed with a sequence of images of a highway section and corresponding traffic data. For example, as shown in FIG. 5B, a feature extraction network (e.g., CNN 514) is fed at the input 506 to update a model of the pre-trained vehicle behavior controller 510 with images 502 and traffic data 505 (e.g., all connected vehicle positions and speeds).

At block 1004, an estimated behavior of a controlled, ego vehicle is disentangled, by the traffic state estimation network, from extracted traffic state features of the input provided by the feature extraction network. For example, as shown in FIG. 5B, the controlled vehicle speed estimation network 570 provides an estimated controlled vehicle speed at the auxiliary task output 572 from extracted traffic state features output by the CNN 514 from the input 506. In addition, a controlled vehicle speed calculation 580 determines the actual controlled vehicle speed 582 based on the images 502 and the traffic data 505 (e.g., all vehicle positions and speeds in successive merging sections shown in the images 502). That is, the images 502 include sequences of images of merging sections.

Aspects of the present disclosure are not limited to the estimated behavior of a controlled, ego vehicle, but also a dynamic traffic state of the surrounding vehicles, road or lanes. For example, as shown in FIG. 9, a dynamic traffic state may be provided by the output of the embedding network 920. As shown in FIG. 5A, the estimated traffic state provided at the auxiliary task output 532 may indicate a dynamic traffic state. For example, the dynamic traffic state may indicate an estimated behavior of a controlled ego vehicle, an estimated behavior of the controlled ego vehicle and/or surrounding vehicles.

In particular, the dynamic traffic state may indicate a current and/or future position, a speed, an acceleration and/or a density of the controlled, ego vehicles and/or the surrounding vehicles relative to the controlled, ego vehicle. In one example implementation, during a lane-change operation, the controlled, ego vehicle may adjust an ego acceleration, while estimating a neighbor vehicle speed. In another implementation of the lane-change operation, the controlled, ego vehicle adjusts a steering angle while estimating a neighbor lane density of surrounding vehicles, for example, as shown in the highway environment 400 of FIGS. 4 and 6.

Referring again to FIG. 10, at block 1006, an action is selected to adjust an autonomous behavior of the controlled ego vehicle according to the estimated behavior of the controlled, ego vehicle. For example, as shown in FIG. 5B, the Q-value calculation 560 computes a temporal answer Q-value 562. In this example, a Q-value is the value of an action α at state s considering immediate reward r and Q-value of next State s1. Here, γ is discount factor of Q-value of s1, as follows $$Q\text{value}=Q(s,\alpha)=r+\gamma\cdot Q(s_1,\alpha_{best}) \quad (15)$$

According to aspects of the present disclosure, If the true Q-value in all states/all actions is known, the best action can be selected. In reality, it is difficult to obtain a true Q-value, so the Q-value calculation approximates the Q-value is (e.g., θ: parameters of the deep merging network 620), as follows:

$$Q\text{value}=Q(s,\alpha|\theta) \quad (16)$$

In addition, a loss function of the deep merging network 620 involves updating the parameters θ is to minimize the loss function:

$$\text{Loss}=\text{HuberLoss}(Q(s,\alpha|\theta)-(r+\gamma\cdot Q(s_1,\alpha_{best}|\theta^-))) \quad (17)$$

As shown in FIG. 5B, the Q-value calculation 560 may use a Target Network with $\theta^-$ to get $Q(s_1, \alpha_{best})$ and calculates a temporal answer, in which $\theta^-$ is synchronized with θ at regular cycle. The estimated Q-value 564 and the temporal answer Q-value 562 are fed back to the Q-value estimation network 516 to adjust the Q-values corresponding to various actions. For example, a selected speed/acceleration/steering angle of the controlled vehicle may be applied as a vehicle control action. This selected action may modify an autonomous behavior of a controlled, ego vehicle. For example, an autonomous behavior of the controlled, ego vehicle may define the selected speed, acceleration, and steering angle of the controller ego vehicle to merge onto a highway main-lane from a highway on-ramp. In this example of FIG. 5B, the actual controlled vehicle speed 582 refers to the autonomous behavior of the controlled vehicle. Using a traffic state estimation network (e.g., the controlled vehicle speed estimation network 570), the pre-trained vehicle behavior controller 510 is trained to adjust the controlled vehicle speed to minimize the impact to highway main-lane traffic from the controlled merging of the controlled, ego vehicle.

In some aspects, the methods shown in FIGS. 6-8 and 10 may be performed by the SOC 100 (FIG. 1) or the software architecture 200 (FIG. 2) of the autonomous vehicle 150. That is, each of the elements or methods may, for example, but without limitation, be performed by the SOC 100, the software architecture 200, the processor (e.g., CPU 102) and/or other components included therein of the autonomous vehicle 150, or the vehicle behavior control system 300.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining, and the like. Additionally, "determining" may include receiving (e.g., receiving information), accessing (e.g., accessing data in a memory), and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules, and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, but, in the alternative, the processor may be any commercially available processor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM, and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may connect a network adapter, among other things, to the processing system via the bus. The network adapter may implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Examples of processors that may be specially configured according to the present disclosure include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout the present disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a non-transitory computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc, where disks usually reproduce data magnetically, while discs reproduce data optically with lasers. Thus, in some aspects computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method of improving efficiency of a vehicle behavior controller using a traffic state estimation network, comprising:
   feeding an input of a feature extraction network of the vehicle behavior controller with a sequence of images of a highway section and corresponding traffic data;
   disentangling, by the traffic state estimation network, an estimated behavior of a controlled ego vehicle from extracted traffic state features of the input provided by the feature extraction network; and
   selecting an action to adjust an autonomous behavior of the controlled ego vehicle according to the estimated behavior of the controlled ego vehicle,
   in which the action comprises the vehicle behavior controller to accelerate a speed of the controlled ego vehicle to successfully mergo onto a highway main-lane from a highway on-ramp according to an estimated neighbor vehicle speed.

2. The method of claim 1, further comprising:
   calculating an actual speed of the controlled ego vehicle from the sequence of images of a merging section and the traffic data; and
   feeding back an error of an estimated speed of the controlled ego vehicle and the actual speed of the controlled ego vehicle to update a convolutional neural network of a model of a pre-trained vehicle behavior controller.

3. The method of claim 1, in which the sequence of images and/or the traffic data is acquired using a road side unit (RSU), in-vehicle sensors, a user-owned map, vehicle-to-vehicle (V2V) communications, and/or vehicle-to-infrastructure (V2I) communications.

4. The method of claim 1, further comprising training the vehicle behavior controller by:
   feeding a convolutional neural network of a pre-trained vehicle behavior controller with sequences of images of merging sections and/or numerical values of the traffic data in a training stage;
   disentangling, by the traffic state estimation network, an estimated traffic state from the extracted traffic state features of the input;
   disentangling, by an impact estimation network, an estimated impact from the extracted traffic state features of the input;
   selecting, by the pre-trained vehicle behavior controller, the action using the estimated impact; and
   saving a selected action, a current state, a reward, and a next state in a replay memory.

5. The method of claim 4, further comprising feeding back an error of the estimated impact and the estimated traffic state to update the convolutional neural network of the pre-trained vehicle behavior controller.

6. The method of claim 1, further comprising:
   merging the controlled ego vehicle onto the highway main-lane from the highway on-ramp; and
   setting a reward for merging the controlled ego vehicle according to a speed of surrounding, connected vehicles on the highway main-lane.

7. The method of claim 1, in which the action further comprises decelerating, the vehicle behavior controller, the speed of the controlled ego vehicle to successfully merge onto the highway main-lane from the highway on-ramp while estimating a neighbor vehicle speed and a neighbor lane density of surrounding vehicles.

8. The method of claim 1, in which the action further comprises adjusting, by the vehicle behavior controller, a steering angle of the controlled ego vehicle to change lanes on the highway main-lane at an adjusted, controlled vehicle speed according to a neighbor lane density of surrounding vehicles.

9. The method of claim 1, in which the sequence of images comprise grayscale images of a merging section captured in successive increments of time.

10. A non-transitory computer-readable medium having program code recorded thereon for improving efficiency of a vehicle behavior controller using a traffic state estimation network, the program code being executed by a processor and comprising:
    program code to feed an input of a feature extraction network of the vehicle behavior controller with a sequence of images of a highway section and corresponding traffic data;
    program code to disentangle, by the traffic state estimation network, an estimated behavior of a controlled ego vehicle from extracted traffic state features of the input provided by the feature extraction network; and
    program code to select an action to adjust an autonomous behavior of the controlled ego vehicle according to the estimated behavior of the controlled ego vehicle,
    in which the action comprises the vehicle behavior controller to accelerate a speed of the controlled ego vehicle to successfully mergo onto a highway main-lane from a highway on-ramp according to an estimated neighbor vehicle speed.

11. The non-transitory computer-readable medium of claim 10, further comprising:
    program code to calculate an actual speed of the controlled ego vehicle from the sequence of images of a merging section and the traffic data; and
    program code to feed back an error of an estimated speed of the controlled ego vehicle and the actual speed of the controlled ego vehicle to update a convolutional neural network of the vehicle behavior controller.

12. The non-transitory computer-readable medium of claim 10, in which the sequence of images and/or the traffic data is acquired using a road side unit (RSU), in-vehicle sensors, a user-owned map, vehicle-to-vehicle (V2V) communications, and/or vehicle-to-infrastructure (V2I) communications.

13. The non-transitory computer-readable medium of claim 10, further comprising program code to train the vehicle behavior controller by:
  feeding a convolutional neural network of a pre-trained vehicle behavior controller with sequences of images of merging sections and/or numerical values of the traffic data in a training stage;
  disentangling, by the traffic state estimation network, an estimated traffic state from the extracted traffic state features of the input;
  disentangling, by an impact estimation network, an estimated impact from the extracted traffic state features of the input;
  selecting, by the pre-trained vehicle behavior controller, the action using the estimated impact; and
  saving a selected action, a current state, a reward, and a next state in a replay memory.

14. The non-transitory computer-readable medium of claim 10, further comprising:
  program code to merge the controlled ego vehicle onto the highway main-lane from the highway on-ramp; and
  program code to set a reward for merging the controlled ego vehicle according to a speed of surrounding, connected vehicles on the highway main-lane.

15. A system to improve efficiency of a behavior control of a controlled ego vehicle, the system comprising:
  a vehicle behavior controller, including a feature extraction network configured to receive a sequence of images of a highway section and corresponding traffic data;
  a traffic state estimation network configured to disentangle an estimated behavior of the controlled ego vehicle from extracted traffic features of an input provided by the feature extraction network; and
  a controller configured to select an action to adjust an autonomous behavior of the controlled ego vehicle according to the estimated behavior of the controlled ego vehicle, in which the action comprises the controller to accelerate a speed of the controlled ego vehicle to successfully merge onto a highway main-lane from a highway on-ramp according to an estimated neighbor vehicle speed.

16. The system of claim 15, in which the action further comprises the controller to decelerate the speed of the controlled ego vehicle to successfully merge onto the highway main-lane from a highway on-ramp according to an estimated neighbor vehicle speed and an estimated neighbor lane density of surrounding vehicles.

17. The system of claim 15, in which the action further comprises the controller to adjust a steering angle of the controlled ego vehicle to change lanes on the highway main-lane at an adjusted, controlled vehicle speed according to an estimated neighbor lane density of surrounding vehicles.

18. The system of claim 15, in which the sequence of images comprise grayscale images of a merging section captured in successive increments of time.

* * * * *